United States Patent [19]

Gilmour et al.

[11] 4,110,518

[45] Aug. 29, 1978

[54] FLUOROCARBON SEAL

[75] Inventors: Alexander Gilmour, Ewell Surrey, England; Henry Rodgers Mallory, Greenwich, Conn.

[73] Assignee: P.R. Mallory & Co. Inc., Indianapolis, Ind.

[21] Appl. No.: 728,673

[22] Filed: Oct. 1, 1976

[51] Int. Cl.² ................. H01M 2/08; C09J 5/00
[52] U.S. Cl. ......................... 429/174; 429/185; 156/306
[58] Field of Search ............... 429/174, 185; 156/306

[56] References Cited

U.S. PATENT DOCUMENTS

| 3,415,690 | 12/1968 | Richman | 429/185 |
|---|---|---|---|
| 3,510,353 | 5/1970 | McHenry | 429/185 |
| 3,715,239 | 2/1973 | Walker et al. | 429/185 |
| 3,939,027 | 2/1976 | Ohya et al. | 156/306 |

OTHER PUBLICATIONS

McHenry et al., Hermetic Compression Seals for Alkaline Batteries, J. Electrochem. Soc., pp. 564–568, May 1972, vol. 119, No. 5.

Primary Examiner—Donald L. Walton
Attorney, Agent, or Firm—Ronald S. Cornell; Israel Nissenbaum; Charles W. Hoffmann

[57] ABSTRACT

An electrochemical device including electrically conductive elements with a polymeric fluorocarbon coating electrically insulating the electrically conductive elements of the device.

A method of making the electrochemical device including the steps of providing an electrically insulating, fluorocarbon material contiguous to one of the electrically conductive elements. The polymer is treated, in situ, to form a substantially continuously adherent coating of polymeric fluorocarbon material over the electrically conductive element.

12 Claims, 4 Drawing Figures

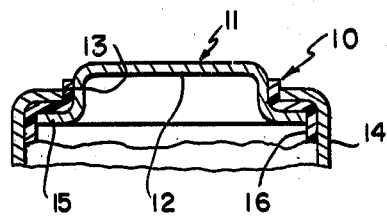
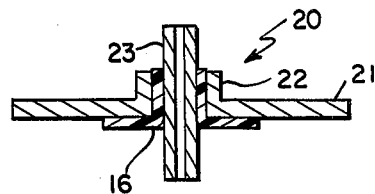
FIG. 1
FIG. 2
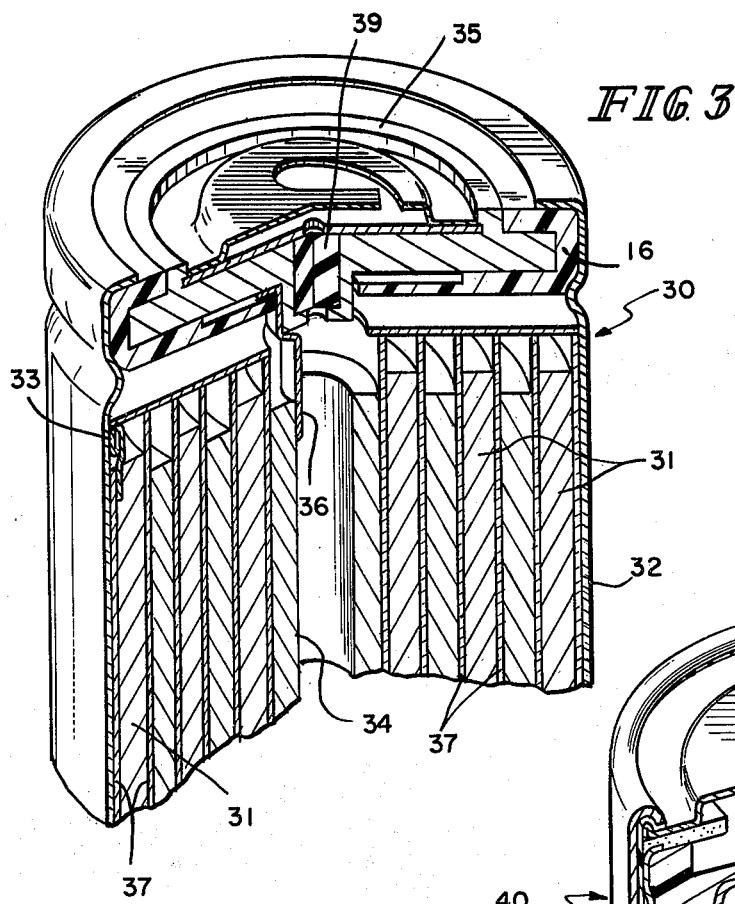
FIG. 3
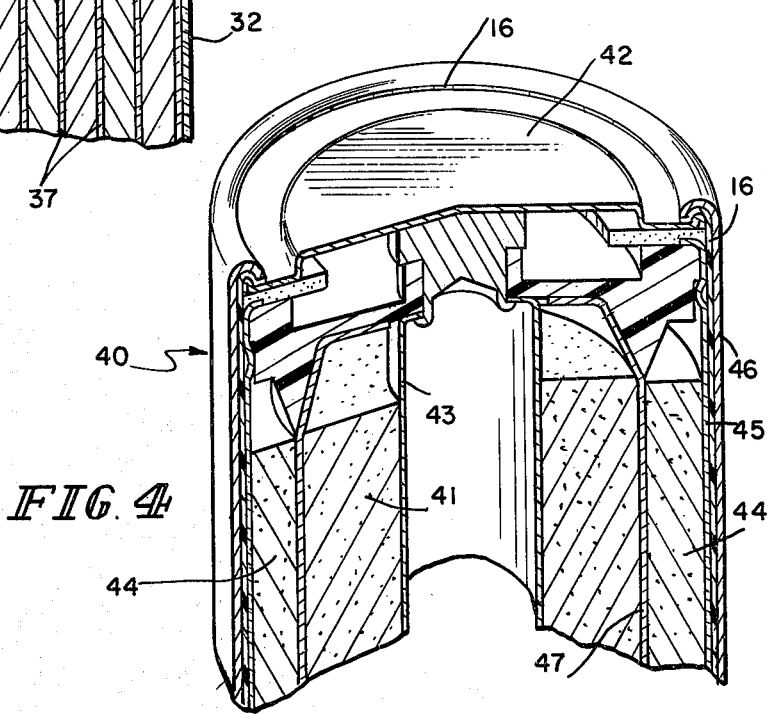
FIG. 4

FLUOROCARBON SEAL

This invention relates to an electrochemical device such as a coulometer or a cell or battery adapted to convert chemical energy into electrical energy and to a method of making the same. Specifically, the present invention relates to an electrochemical device with electrically conductive elements electrically insulated and separated by a substantially continuous member formed of a polymeric fluorocarbon material. The method includes the step of treating, in situ, fluorocarbon polymer to form an adherent coating thereof over at least one of two electrically conductive elements to electrically, insulatively separate the electrically conductive elements of the electrochemical device.

To close and seal the open end of a container, known electrochemical devices use a preformed, ring-shaped gasket or grommet compressively retained between an electrically conductive element (sometimes referred to as the "top assembly") and another electrically conductive element (sometimes referred to as the "container" or "case") by a crimp formed in the container. U.S. Pat. No. 3,427,204 shows such an electrochemical device. Generally, the gasket or grommet material is unaffected by the chemistry of the electrolyte and is extrudible to a degree so that the container can be crimped. Prior art grommet materials include polyolefins, polyamides, polyvinyl resins and rubber. The gasket or grommet material also serves to electrically insulate the electrically conductive top assembly from the electrically conductive container.

A problem sometimes associated with electrochemical devices is leakage of electrolyte from the electrochemical device which sometimes occurs, said leakage following a flow path between the gasket and the container or top assembly. Such leakage sometimes occurs due to deterioration or movement of the gasket or grommet material between the top assembly and the container, but can occur even without either deterioration or movement of the gasket because the gasket is not adhered to the contiguous elements. Moisture can sometimes seep through a deteriorated area into the interior of the electrochemical device. This can cause the container to deform. Leakage can also occur from the interior of the electrochemical device outwardly, in which case the electrolyte can be corrosively damaging to the electrochemical device itself as well as to apparatus to be energized by the electrochemical device.

Unexpectedly, it was found that, although polytetrafluoroethylene (the most well known fluorocarbon) cannot be used in accordance with present invention because it will not satisfactorily adhere to metal surfaces, a polymeric fluorocarbon material as defined herein can be treated, in situ, to form a substantially continuously adhered member which not only can replace conventional grommets or gaskets but will be a superior sealing and insulating means due to its physical adherence property and its chemical inertness. Such a coating electrically insulates and adequately closes and seals the container, and is substantially unaffected by a wide variety of electrolyte components such as sulfur dioxide ($SO_2$), oxyhalides including thionyl chloride ($SOCl_2$), acetonitrile, methyl formate, acids such as sulfuric acid, and bases such as hydroxides, including sodium hydroxide (NaOH) and potassium hydroxide (KOH). The polymeric materials used are not soluble in an electrolyte, nor are they active, even with an oxyhalide component as suggested by U.S. Pat. No. 3,992,174 wherein $(C_xF)_n$ polymers are disclosed as active cathode materials.

The polymeric fluorocarbon can be formed, in situ, by any suitable method which includes the steps of providing said polymeric material contiguous to selected portions of a surface or surfaces to be insulated from each other and sealed, and then using heat, or heat and pressure, to form a substantially continuously adhered layer of polymeric material. Suitable methods of applying the polymer to a surface include placing a preformed polymeric mass thereon or brushing, spraying, dipping or electrodepositing said polymer over the surface to be coated.

A feature of the present invention is an electrochemical device or electrical current power source including electrically conductive elements with a polymeric, fluorocarbon material electrically insulating one of the electrically conductive members from another of the electrically conductive members. Another feature of the present invention is a method including the steps of providing the polymeric fluorocarbon materials of this invention contiguous to one or both of the electrically conductive members and treating said material in situ to form a substantially continuous coating of the material between adjacent surfaces of the members.

In the drawing:

FIG. 1 is a partial, longitudinal, cross-sectional view of a top assembly of an electrochemical device embodying concepts of the present invention;

FIG. 2 is a partial, longitudinal, cross-sectional view of a fill tube area of an electrochemical device embodying concepts of the present invention;

FIG. 3 is a perspective view in partial cross-section and showing an electrochemical device of the lithium/sulfur dioxide type embodying the concepts of the present invention; and FIG. 4 is a perspective view in partial cross-section and showing an electrochemical device of the alkaline manganese type embodying the concepts of the present invention.

Referring now to FIG. 1 of the drawing, there is shown a top assembly 10 of an electrochemical device (not shown) embodying concepts of the present invention. A hat-shaped electrically conductive element 11 (part of the top assembly of an electrochemical device) includes a crown 12 projecting through an aperture 13 formed in electrically conductive element 14 (part of the container of an electrochemical device). Flange 15 of conductive element 11 has a diameter exceeding the diameter of the aperture 13 formed by crimping the upper end of element 14.

A member 16 of a polymeric fluorocarbon as described herein is positioned between and electrically insulates conductive element 11 from conductive element 14. Member 16 is substantially continuously adhered to elements 11 and 14 along its entire interface with them, such adherence being effected through the combined use of heat and pressure whereupon the polymer coalesces and adheres to said elements 11 and 14 to form a permanent seal.

A polymeric fluorocarbon material suitable for use in the present invention is one which is resistant to chemical action of the components of the electrolyte cell; is electrically insulating, that is, has an electrical resistivity of at least about $10^{13}$ ohm-cm or higher; is moisture resistant; has good dimensional stability, impact strength, tensile strength and long term stability; flows at elevated temperature; and which will remain a substantially continuous, adherent, electrolyte resistant coating at the usual operating temperatures of the electrochemical device.

Suitable polymeric fluorocarbon materials are those comprised of repeating units having the formula

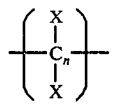

wherein $n$ is a whole number equal to or greater than 2 and wherein X represents radicals, at least one of which within each repeating unit is fluorine, and at least one of which in each repeating unit is a radical other than fluorine. Generally, those radicals in said repeating unit which are not fluorine are selected from the group consisting of chlorine, bromine, hydrogen, $RY_3$, $-ORY_3$ and mixtures thereof, wherein Y represents halogen or hydrogen or a mixture thereof, and R is an alkyl chain of 1-6 carbon atoms.

Examples of useful materials include: FEP copolymers which are copolymers of fluorinated ethylene and propylene, one such copolymer being marketed as "Teflon" FEP resin by E. I. du Pont de Nemours & Co., Inc. of Wilmington, DE, U.S.A; $PVF_2$ which is a homopolymer of vinylidene fluoride one such polymer being marketed as "Kynar" by Pennwalt Corp, Philadelphia, Pa., U.S.A.; ETFE copolymers which are copolymers of ethylene and tetrafluoroethylene; E-CTFE copolymers such as "Halar", sold by Allied Chemical Corp. of Morristown, N. J., U.S.A.; CTFE polymers which are chlorotrifluoroethylene resins such as "KEL-F" available from 3M Co. or "plaskon" from Allied Chemical Corp.; PVF polymers which are polyvinyl fluoride resins such as "Tedlar", availablr from E. I. du Pont de Nemorous & Co. Inc.; and polymers having a fluorocarbon backbone and a perfluoro alkoxy (PFA) side chain wherein the alkoxy radical contains from 1-6 carbon atoms. PFA polymer is available from E.I. du Pont de Nemours & Co. Inc. It has been found that conventional polytetrafluoroethylene lacks the ability to properly adhere to conductive metal surfaces and is, therefore, unacceptable for use in the present invention.

In one embodiment of the invention a cross-linking agent is added to the polymer. When the polymer is subsequently coalesced by heat the cross-linking agent is activated and the polymer is cured. The cured, cross-linked polymer is no longer thermoplastic and the cell can therefore be subjected to higher temperatures. In addition, the polymer becomes denser thereby reducing gas permeability, and the coefficient of expansion is reduced so that it more closely matches the coefficient of expansion of the metals with which it is in contact. The use of a cross-linking agent is particularly desirable with polyvinylidene fluoride polymers. A typical class of useful cross-linking agents include organic peroxides such as benzoyl peroxide.

In forming the seals of the invention, polymeric material is applied to a surface of a conductive element, e.g. either element 11 or element 14 or both elements. The polymeric material can be applied to a surface of a conductive element by (a) placing a preform of the polymer contiguous to the application surface; or (b) preheating the application surface to a temperatures sufficient to cause powdered particles to adhere thereto, and then passing the surface through a fluidized bed containing polymeric material particles suspended in air; or (c) directing powdered particles, entrained in air, toward a preheated application surface from either a hand held or automatic powder spray gun; or (d) brushing polymer particles over the application surface; or (e) dipping the surface in a bath containing powdered polymer particles suspended in a suitable fluid vehicle which causes the polymer particles to adhere to the surface; or (f) blowing powdered polymeric particles past an electrically charged surface; or (g) electrodepositing particles of the material from a particle dispersion in a suitable liquid dispersing medium by dipping the surface into the medium and using electric forces to cause polymers to deposit over the surface.

Polymer applied to the surface of element 11 or 14 or both is treated to cause the polymer to coalesce to form a substantially continuously adhered coating 16 of the polymeric fluorocarbon material. The coating 16 can be permanently adhered to the surface by treating applied particles with heat alone or through the use of a combination of heat and pressure. The amount of heat, or heat pressure, required to form the coating 16 should be sufficient to coalesce the polymer into a unitary, substantially nonporous mass which will adhere to the element 11 or 14 or both yet not harmfully affect the desired properties of chemical inertness to electrolyte components and electrical insulation by overheating the particulate material. Generally speaking, a polymeric fluorocarbon powder useful in the present invention has melting point temperature of about 150° C to 400° C, and, preferably, a melting point temperature between 225° C and about 325° C. Usually, the application of pressure upon member 16 reduces the amount of heat required to form the desired adherent coating. Generally speaking, about 2.5 kilograms per square centimeter or higher, and preferably, about 3.5 to about 15 Kilograms per square centimeter may be applied to the powder during formation of coating 16.

To facilitate forming the desired adherent coating in order to form a seal between adjacent surfaces of each conductive element by the member 16, the application surface of the element should be free of contamination materials such as scale, rust, flux, grease and the like.

Preferably, member 16 extends sufficiently over surfaces of either conductive element 11 or 14 or both to guard against harmful disruptive electrical discharges and electrical shorting between such surfaces. FIG. 1 shows coating 16 extending a suitable distance beyond the peripheral edge of flange 15 of top assembly 11 and extending along crown 12 a suitable distance beyond the peripheral crimped edge of aperture 13 of element 14.

FIG. 2 illustrates a fill tube assembly 20 associated with an electrochemical device (not shown). Electrically conductive element 21 includes a flange 22 used to provide structural support for fill tube 23. Substantially continuously adhered member 16 is positioned between fill tube 23 and electrically conductive element 21. Fill tubes are employed with many cells, for example lithium/sulfur dioxide, non-aqueous, primary cells.

FIG. 3 illustrates one type of non-aqueous, lithium/$SO_2$, primary electrochemical cell 30 embodying concepts of the present invention. Cell 30 is primarily intended for single exhaustion of its energy content. Cell 30 includes a lithium anode 31, a metal container 32 (analogous to electrically conductive element 14 of FIG. 1) connected to the lithium foil anode by metal tab 33, a carbon containing cathode 34, a metal top assembly 35 (analogous to electrically conductive element 11 of FIG. 1) connected to the carbon containing cathode by metal tab 36, an electrically insulating polypropylene separator 37 convolutely wound with the foil anode 31 and the carbon containing cathode 34 so as to separate the foil anode from the cathode, an insulator (not shown) insulatively spacing the carbon containing cathode from the bottom of container 32, and member 16 electrically insulating the top assembly 35 from the container 32. The electrolyte-depolarizer sulfur dioxide ($SO_2$), is introduced into the interior of cell 30 through septum 39.

FIG. 4 illustrates a cylindrical, alkaline manganese, primary cell 40 with a crimped container embodying concepts of the present invention. Cell 40 comprises an anode 41 including compacted zinc power, a metal top assembly 42 (analogous to electrically conductive element 11 of FIG. 1) connected to the zinc anode by anode collector 43, a cathode 44 including compacted manganese dioxide powder, a metal container 45 connected to the cathode by contact therewith, a positive bottom assembly (not shown) connected to an outer metal container 46 (analogous to electrically conductive element 14 of FIG. 1) by contact therewith (not shown) in the vicinity of the bottom assembly, and an absorbent separator 47 impregnated with mobile electrolyte containing potassium or sodium hydroxide as a component. Among other things, the manganese dioxide functions as a cathode depolarizer during conversion of chemical energy into electrical energy. Member 16 is positioned between the crimp of outer container 46 and the crimp of the top assembly 42, and member 16 extends the entire longitudinal length of the electrochemical device between container 45 and container 46.

The following examples are given to enable those skilled in this art to more clearly understand the concepts of the present invention. The examples should not be considered as a limitation upon the scope of the present invention, but merely as being illustrative thereof.

EXAMPLE 1

An aluminum, electrically conductive element 11 having the hatlike configuration of FIG. 1 and a steel electrically conductive element 14 are suitably cleaned of contaminants such as scale, rust, flux and grease, and rinsed. A ring-shaped preform of polyvinylidene fluoride is placed between element 11 and element 14. The preform is treated, in situ, by heating to a temperature of 250° C for 5 minutes under a pressure of about 8.5 kilograms per square centimeter. Elements 11 and 14 and the coating are cooled. The result is a substantially continuously adhered coating 16 of coalesced polyvinylidene fluoride particles adhered to elements 11 and 14, said coating having a thickness of about 20 mils. Member 16 has good electrical insulation properties and chemical resistance to electrolyte components of electrochemical devices.

EXAMPLE 2

A portion of a steel, electrically conductive element 21 is masked so as to exclude the application of chlorotrifluoroethylene powder over the masked surfaces. Element 21 is then preheated to a temperature of about 250° C. The preheated element is passed through a bed containing chlorotrifluoroethylene powder suspended in air. Powder adheres to unmasked surfaces of element 21. The element is removed from the bed. Fill-tube element 23 is inserted through coating 16. The applied powder is treated by heating to a temperature of 225° C for about 1 minute in a suitable locating fixture. Elements 21 and 23 and the coating are cooled. The result is a substantially continuous coating 16 (about 30 mils thick) of coalesced chlorotrifluoroethylene polymer adhered to elements 21 and 23. Coating 16 has good electrical insulation properties and chemical resistance to electrolyte components of electrochemical devices.

EXAMPLE 3

A cell as shown in FIG. 3 is made using as element 16 a preformed ring formed of a copolymer of fluorinated ethylene and propylene ("Teflon" FEP). After the cell is formed, the upper end thereof is heated by induction heating to a temperature of 300° C for 0.25 minute. This heating step coalesces and FEP causing it to adhere to the adjacent surfaces of elements 32 and 35. The FEP thereby acts as an efficient seal as well as an insulation between the polar surfaces of the cell.

EXAMPLE 4

A cell as shown in FIG. 4 is made using as element 16 a poly (ethylene-chlorotrifluoroethylene) copolymer ("Halar"). The copolymer is coalesced by heating it to 180° C for 4 minutes. The resulting cell is leakproof and the polar elements 42,46 are electrically insulated from each other.

What is claimed is:

1. An electrochemical device including electrically conductive elements and a single element separating and electrically insulating one of the electrically conductive elements from the other electrically conductive element, said electrically insulating element being formed of a material comprising a polymeric, fluorocarbon with repeating units having the formula:

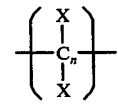

wherein $n$ is a whole number equal to or greater than 2 and wherein $x$ represents radicals, at least one of which within each repeating unit is a radical other than fluorine, and wherein the polymeric material comprises a coalesced material dielectrically separating and directly adhered to said electrically conductive elements.

2. The electrochemical device of claim 1 wherein those radicals in said repeating unit which are not fluorine are selected from the group consisting of chlorine, bromine, hydrogen and $-RY_3$, $-ORY_3$ and mixtures thereof, wherein Y represents halogen or hydrogen or a mixture thereof and R is a chain of 1–6 carbon atoms.

3. The electrochemical device of claim 1, wherein the electrochemical device is a cell and the polymeric material dielectrically separates the polar surfaces of said cell.

4. The electrochemical device of claim 2 wherein said polymeric, fluorocarbon is selected from the group consisting of copolymers of fluorinated ethylene and propylene, polyvinyl fluoride, polyvinylidene fluoride, copolymers of ethylene and tetrafluoroethylene, chlorotrifluoroethylene polymers, and polymers having a fluorocarbon backbone and a perfluoro alkoxy said chain.

5. The electrochemical device of claim 3 wherein said polymeric material forms a substantially hermetic seal.

6. In a method of making the electrochemical device of claim 1, the steps of providing said electrically insulating polymeric material, inert to chemical action of the electrolyte, in solid form between adjacent conductive elements and coalescing the polymeric material in situ to adhere it to adjacent surfaces of said conductive elements.

7. The method of claim 6, wherein the step of coalescing the polymeric material includes heating the polymeric material to adhere coalesced polymer to said element.

8. The method of claim 7, wherein the step of coalescing the polymeric material comprises heating said material to a temperature of between about 150° C and 400° C.

9. The method of claim 7 wherein said step of coalescing the polymeric material further includes the application of pressure thereto.

10. The method of claim 6, wherein said polymeric material is capable of forming a liquid when heated to between about 150° C to 400° C.

11. The method of claim 6, wherein said step of coalescing is achieved by inductively heating said polymeric material.

12. The method of claim 6, wherein said step of coalescing is achieved by raising the temperature of said polymeric material beyond its incipient melting point.

* * * * *

UNITED STATES PATENT AND TRADEMARK OFFICE
CERTIFICATE OF CORRECTION

PATENT NO. : 4,110,518
DATED : August 29, 1978
INVENTOR(S) : Alexander Gilmour, Henry Rogers Mallory It is certified that error appears in the above-identified patent and that said Letters Patent are hereby corrected as shown below:

Column 2, line 1, change "3,992,174" to ---3,922,174---.

Column 2, line 4, after "fluorocarbon" insert ---coating---.

Column 3, line 37, change "availablr" to ---available---.

Signed and Sealed this

Seventeenth Day of March 1981

[SEAL]

Attest:

RENE D. TEGTMEYER

Attesting Officer

Acting Commissioner of Patents and Trademarks